(12) United States Patent
Seo et al.

(10) Patent No.: US 10,862,881 B2
(45) Date of Patent: Dec. 8, 2020

(54) METHOD OF MANAGING SHARED FILES AND DEVICE FOR AUTHENTICATING SUBSCRIBER BY USING SAME

(71) Applicant: KT Corporation, Seongnam-si (KR)

(72) Inventors: Myoung Hee Seo, Seoul (KR); Jin Hyoung Lee, Seoul (KR); Kwan Lae Kim, Seoul (KR); Chui Hyun Park, Seoul (KR); Hyung Jin Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/696,284

(22) Filed: Sep. 6, 2017

(65) Prior Publication Data

US 2018/0013759 A1   Jan. 11, 2018

Related U.S. Application Data

(63) Continuation of application No. 14/424,286, filed as application No. PCT/KR2013/007518 on Aug. 22, 2013, now abandoned.

(30) Foreign Application Priority Data

Aug. 29, 2012 (KR) .......... 10-2012-0094803
May 22, 2013  (KR) .......... 10-2013-0057765

(51) Int. Cl.
*H04L 29/06* (2006.01)
*H04W 12/06* (2009.01)
(Continued)

(52) U.S. Cl.
CPC .......... *H04L 63/0853* (2013.01); *G06F 21/34* (2013.01); *H04L 63/123* (2013.01);
(Continued)

(58) Field of Classification Search
CPC . H04L 63/0853; H04L 63/123; H04L 63/102; G06F 21/34; H04W 12/06; H04W 12/08; H04W 12/10; H04W 88/02
See application file for complete search history.

(56) References Cited

U.S. PATENT DOCUMENTS 6,425,522 B1 * 7/2002 Matsumoto ........ G06Q 20/3552
                                               235/380
8,090,844 B2   1/2012 Chene et al.
(Continued)

FOREIGN PATENT DOCUMENTS

KR   10-2008-0065158 A   7/2008
WO   2010/123890 A1   10/2010

OTHER PUBLICATIONS

International Search Report for PCT/KR2013/007518 dated Dec. 2, 2013 [PCT/ISA/210].
(Continued)

*Primary Examiner* — Kristine L Kincaid
*Assistant Examiner* — Alexander R Lapian
(74) *Attorney, Agent, or Firm* — Sughrue Mion, PLLC (57) ABSTRACT

A method of managing a file of a subscriber authenticating module embedded in a terminal device and a module for authenticating a subscriber by using the method. The method of managing the file includes configuring a file structure for one or more profiles and managing one or more files included in the file structure in response to a request. Thus, the method is efficient for a multiple-profile environment.

14 Claims, 9 Drawing Sheets

(51) Int. Cl.
   *H04W 12/08* (2009.01)
   *H04W 12/10* (2009.01)
   *G06F 21/34* (2013.01)
   *H04W 88/02* (2009.01)

(52) U.S. Cl.
   CPC ........... *H04W 12/06* (2013.01); *H04W 12/08* (2013.01); *H04W 12/10* (2013.01); *H04L 63/102* (2013.01); *H04W 88/02* (2013.01)

(56) References Cited

U.S. PATENT DOCUMENTS

| | | |
|---|---|---|
| 8,887,257 B2 | 11/2014 | Haggerty et al. |
| 2006/0080397 A1 | 4/2006 | Chene et al. |
| 2010/0062808 A1* | 3/2010 | Cha ............... G06Q 20/35765 455/558 |
| 2010/0197350 A1 | 8/2010 | Jeung |
| 2011/0099605 A1 | 4/2011 | Cha et al. |
| 2011/0130117 A1 | 6/2011 | Fan et al. |
| 2011/0154220 A1 | 6/2011 | Chunilal |
| 2011/0207454 A1 | 8/2011 | Garg et al. |
| 2012/0041903 A1 | 2/2012 | Beilby et al. |
| 2013/0122864 A1 | 5/2013 | Haggerty et al. |
| 2013/0165073 A1 | 6/2013 | Madsen |
| 2013/0227646 A1 | 8/2013 | Haggerty et al. |
| 2013/0231087 A1 | 9/2013 | O'Leary |
| 2013/0295997 A1* | 11/2013 | Sen ..................... H04W 8/183 455/558 |
| 2014/0011541 A1* | 1/2014 | Cormier ............... H04W 8/183 455/558 |

OTHER PUBLICATIONS

Written Opinion for PCT/KR2013/007518 dated Dec. 2, 2013 [PCT/ISA/237].

Y.M. Park, et al., "Overview of Converged Profile Management and Authentication Control Techniques", ETRI, 2006, pp. 86-94 (10 pages total).

Communication dated Nov. 19, 2019 issued by the Korean Intellectual Property Office in counterpart Korean Application No. 10-2013-0057765.

* cited by examiner

| STRUCTURE OF EF_DIR 5000 | | | 5003 |
|---|---|---|---|
| AID TLV | Label TLV | | LCSI TLV |
| AID of Application 1 | "NAA 1" | | Operational State - activated |
| : | : | | : |
| AID of Application N | "NAA N" | | Operational State - deactivated |

METHOD OF MANAGING SHARED FILES AND DEVICE FOR AUTHENTICATING SUBSCRIBER BY USING SAME

CROSS-REFERENCE TO RELATED APPLICATIONS

This is a continuation of application Ser. No. 14/424,286 filed Feb. 26, 2015, which is a National Stage Entry of the PCT Application No. PCT/KR2013/007518 filed on Aug. 22, 2013 and which also claims the benefit of priority from Korean Patent Application No. 10-2012-0094803, filed on Aug. 29, 2012 and Korean Patent Application No. 10-2013-0057765, filed on May 22, 2013, in the Korean Intellectual Property Office. The disclosures of all of these applications are incorporated herein by reference in their entireties.

BACKGROUND

1. Field

An apparatus and a method consistent with exemplary embodiment broadly relate to shared file management for a subscriber certification device, and to a shared file management method for a multi-profile environment, and a subscriber certification apparatus using the same.

2. Description of Related Art

A universal integrated circuit card (UICC) is a smart card that is tangible and can be inserted into a terminal and configured to perform network access certification. The UICC may include network access applications (NAAs) which are applications for access to several networks of providers, such as a universal subscriber identity module (USIM) for WCDMA/LTE network access or a subscriber identity module (SIM) for GSM network access.

An embedded SIM (hereinafter, eSIM or eUICC) integrally mounted at the time of terminal manufacture for terminals requiring a small size and durability such as machine to machine (M2M) terminals, instead of an existing detachable UICC, has been proposed.

The eUICC provides a network access certification function, similarly to the existing detachable UICC. However, access to networks of several providers should be processed using one UICC due to a difference between physical structures, and there are many issues such as eUICC opening/distribution/subscriber information security. A solution thereto may be necessary. In order to solve this, international standardization organizations such as GSMA and ETSI have standardized necessary elements including a top structure together with related companies such as providers, manufactures, or SIM vendors.

However, most standards related to eUICC implementation have not been clearly defined, and technical issues related to a profile still exist.

SUMMARY

An aspect of exemplary embodiments is to provide a shared file management method that is efficient for a multi-profile environment.

Another aspect of exemplary embodiments is to provide a subscriber certification apparatus using the shared file management method.

Illustrative, non-limiting embodiments may overcome the above disadvantages and other disadvantages not described above. The inventive concept is not necessarily required to overcome any of the disadvantages described above, and the illustrative, non-limiting embodiments may not overcome any of the problems described above. The appended claims should be consulted to ascertain the true scope of the invention.

According to an exemplary embodiment, a method of managing files of a subscriber certification module is provided. The method includes forming a file structure having one or more profiles for providing network access to a mobile terminal; storing the formed file structure on the subscriber certification module which is a card embedded into the mobile terminal, and managing one or more files included in the file structure in response to a request. The managing includes updating, deleting, or adding an access profile for the network access in the file structure.

The file may include state information of one or more network access applications.

Further, the file structure may include a master file, and one or more files associated with the master file.

The one or more files associated with the master file may include an application directory file which may include a network access application list and state information of each network access application in the list.

A state of each network access application may be an activated state or a deactivated state.

The method may further include receiving the request from an external interworking device.

The external interworking device may include a mobile network operator server or a subscription manager server remote from the mobile terminal.

The method may further include receiving the request from a shared file manager or a profile, located in the subscriber certification module.

The managing of one or more files included in the file structure in response to the request may include updating data stored in the application directory file in response to a request with an access right.

The access right for updating of the application directory file may be based on an administrator certification.

Further, the managing of the files included in the file structure in response to the request may further include registering network access application related information for an added profile when a new profile is installed.

According to an aspect of an exemplary embodiment, a subscriber certification apparatus built into and installed in a mobile terminal apparatus includes a shared file memory which stores one or more profile-related files and one or more corresponding network access applications with respective state information and a processor configured to manage one or more profile-related files. The managing including updating, deleting, or adding one or more network access application and/or data therein.

The shared file memory may further store a master file, and one or more files associated with the master file.

The subscriber certification card may further include a shared file manager that manages one or more files included in the shared file memory.

Further, the shared file manager may manage the one or more profiles and related file stored in the shared file memory.

One or more files or file information stored in the shared file memory may be changed in response to a request from the processor, the shared file manager, or an external interworking device.

According to exemplary embodiments, by providing the shared file management method that is efficient for a multi-profile environment, it is possible to embody roles and development ranges of eco-system providers of the eUICC, such as eUICC card manufacturers, network service providers, and profile management servers.

BRIEF DESCRIPTION OF DRAWINGS

Non-limiting and non-exhaustive exemplary embodiments will be described in conjunction with the accompanying drawings. Understanding that these drawings depict only exemplary embodiments and are, therefore, not to be intended to limit its scope, the exemplary embodiments will be described with specificity and detail taken in conjunction with the accompanying drawings, in which.

DETAILED DESCRIPTION OF EXEMPLARY EMBODIMENTS

Exemplary embodiments may be variously changed, and may include several other exemplary embodiments. Specific exemplary embodiments will be illustrated in the drawings and described in detail.

However, the present invention is not limited to exemplary embodiments, and should be construed as including all modifications, equivalents, and alternatives falling within the spirit and scope of an inventive concept.

The terminology used herein is for the purpose of describing particular embodiments only and is not intended to be limiting of inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Terms to be described below are defined in consideration of functions in exemplary embodiments, and may be referred to as other terms according to intention of a client, an operator or a user, a precedent, or the like. Therefore, terms should be defined based on content throughout this specification.

The term eUICC (embedded UICC) or eSIM (embedded SIM) in an exemplary embodiment has a meaning distinguished from an existing detachable UICC and is an embedded SIM (Subscriber Identity Module) integrally mounted with a terminal at the time of a manufacture of a terminal.

"Terminal" in an exemplary embodiment may be referred to as a mobile station (MS), a user equipment (UE), a user terminal (UT), a wireless terminal, an access terminal (AT), a terminal, a subscriber Unit (SU), a subscriber station (SS), a wireless device, a wireless communication device, a wireless transmit/receive unit (WTRU), a mobile node, mobile device, or other terms. Various exemplary embodiments of the terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, music storage and playback appliances having a wireless communication function, or internet appliances capable of wireless Internet accessing and browsing, as well as a portable component or handset devices with combinations of such functions.

In addition, the terminal may include an M2M (Machine to Machine) terminal or an MTC (Machine Type Communication) terminal/device in an exemplary embodiment, but is not limited thereto.

Further, each block or each operation described in exemplary embodiments may indicate a module, a segment, or some codes that include one or more executable instructions for executing a specific logical function(s). Further, in exemplary embodiments, it is to be understood that functions described in blocks or operations can be generated in a different order. For example, two blocks or operations illustrated in succession can be performed simultaneously or can be performed in a reverse order according to their functions.

Hereinafter, exemplary embodiments will be described in detail with reference to the accompanying drawings. In order to facilitate general understanding in describing exemplary embodiments, the same elements on the drawings are denoted with the same reference numerals and repeated description thereof will be omitted.

A detachable UICC is generally developed according to a standard of a network provider (MNO), and a structure and a data value thereof are not changed except for personalization-related data (for example, MSISDN) after commercialization.

However, there may be a multi-profile on the eUICC, and a profile may be added, state-changed, or deleted at a time when the eUICC is commercialized and operated, unlike a detachable UICC in the related art.

Thus, the eUICC can be used by several network providers (MNO) in the form of one chip due to physical characteristics. In this case, it is necessary to support the same file structure, security attributes, logic characteristics, and commands as those of an existing detachable UICC.

A module called a profile is defined for post personalization of an application for a network access certification function of several providers to the eUICC, and requirements are established to remotely install and manage this module.

Exemplary embodiments provides a method of efficiently managing shared files in an eUICC so as to provide a file structure and functions compatible with an existing UICC in a multi-profile environment.

That is, in an exemplary embodiment, a specific file structure of eUICC is provided in which multiple profiles are included.

Figure 1:
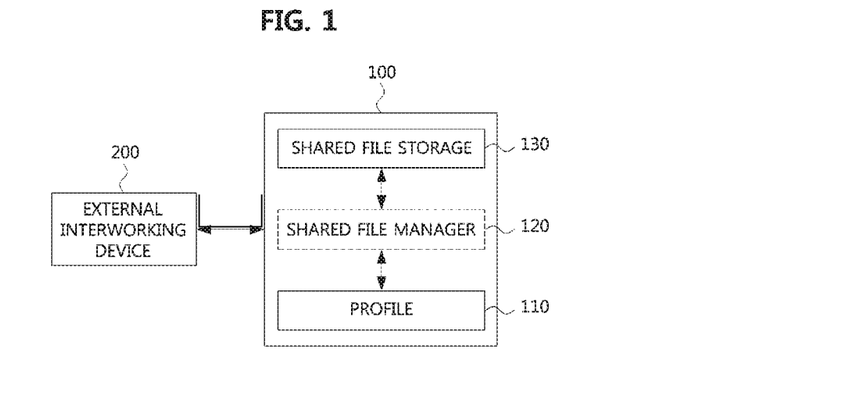
FIG. 1 is a block diagram illustrating a eUICC according to an exemplary embodiment.

FIG. 1 is a block diagram illustrating eUICC according to an exemplary embodiment.

According to an exemplary embodiment, components to be described below with reference to FIG. 1 are components defined by functional division rather than physical division, and may be defined by their functions. Each component, in an exemplary embodiment, may be implemented by hardware and/or a program code and a processing unit that perform each function. The functions of two or more components may be included as one component and may be implemented as such.

Therefore, in an exemplary embodiment, a name of each component is not intended to physically divide the component and is given to suggest a representative function of each component. It is to be noted that an exemplary embodiment is not limited by the name of each component.

The eUICC 100 according to an exemplary embodiment may include a profile 110, and a shared file storage 130, and may selectively include a shared file manager 120.

The profile 110 according to an exemplary embodiment is a module including one or more network access applications (including parameter data, a file structure or the like for network access), and network access credentials. The profile can be accessed with a unique value (ID) on the eUICC, and types of profile include a provisioning profile, an operational profile, and the like.

The provisioning profile is a profile including one or more network access applications and related network access credentials that enable access to a communication network when the provisioning profile is installed on the eUICC to provide transport capability for eUICC and profile management between the eUICC and a subscription manager-secure routing (SM-SR).

The operational profile is a profile including one or more network access applications and related connection credentials.

The shared file storage 130 stores one or more profile related files. The file storage also includes state information of one or more network access applications related to the one or more profiles.

The file structure stored in the shared file storage 130 includes a master file, and one or more files associated with the master file. Here, the one or more files associated with the master file include an application directory file including a network access application list and state information of each network access application. In an exemplary embodiment, the shared file storage may be a memory in the eUICC 100.

Meanwhile, according to an exemplary embodiment to be described with reference to FIG. 11 below, the eUICC may selectively include the shared file manager 120. The shared file manager 120 manages the one or more files included in the shared file storage 130, and may request registration, state change, deletion, or the like of the network access application with respect to the one or more files included in the shared file storage 130.

In an exemplary embodiment in which the shared file manager 120 is not separately defined, the profile 110 according to an exemplary embodiment can manage the one or more files included in the shared file storage 130 and can request registration, state change, deletion, or the like of the network access application with respect to the one or more files included in the shared file storage 130. In an exemplary embodiment, the profile and the shared file manager may be implemented on a microprocessor or the like.

The eUICC 100 according to an exemplary embodiment is connected to one or more external interworking devices 200, and may interwork with a MNO-OTA (Mobile Network Operator-Over The Air) and a MNO core network (not illustrated).

In this case, the one or more external interworking devices 200 may be, for example, subscription mangers (SMs) that are subscription manager modules, or profile owner servers (MNOs). The SMs and MNOs are a combination of hardware and software and may include at least a processor and a memory according to an exemplary embodiment.

The MNO-OTA and the MNO core network are operated by an entity that provides communication service to customers over a mobile network, that is, a mobile network operator, and communicate with the terminal.

The subscription manager module serves to safely perform a function of directly managing the operational profiles and the provisioning profiles on the eUICC. The subscription manager module also serves to prepare for the operational profiles and the provisioning profiles to be safely provisioned on the eUICC, such as, to perform encryption of the profile.

The eUICC according to an exemplary embodiment as illustrated in FIG. 1 provides a method of selecting a network access application (NAA) of a profile (an activated profile or an installed profile) to be compatible with an existing UICC (that is, a detachable UICC) even when the profile is changed.

According to an exemplary embodiment, specific examples of the method of selecting the network access application of the profile may include a method of directly selecting the network access application using an application ID (AID; Application Identifier), a method of directly selecting the network access application using a value of a part of the AID, and a method of selecting the network access application through Elementary Files Directory ($EF_{DIR}$).

Further, it is preferable for the eUICC according to an exemplary embodiment to support a file structure and a protocol independent from the application defined in ETSI TS 102 221 to be compatible with an existing UICC regardless of installation of the profile and the state of the profile.

In an exemplary embodiment, a file structure and a management method when several profiles are dynamically installed are provided.

Specifically, in an exemplary embodiment, by defining the shared file structure including an applications list, an eUICC ID, preferred language, and the like installed in the eUICC in a multi-profile environment, the eUICC provides a data structure and a network access function compatible with an existing detachable USIM card.

Exemplary embodiment provides a method of managing an application list in $EF_{DIR}$ according to installation/deletion of a profile, and a method of managing a shared file access right (access condition).

Figure 2:
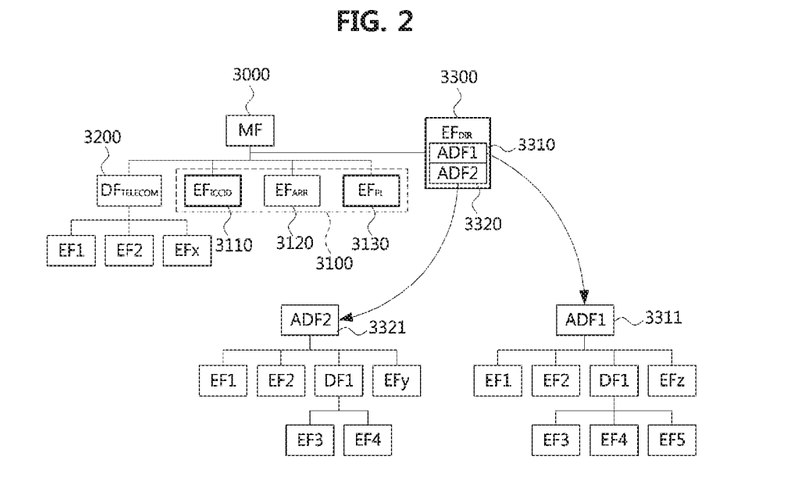
FIG. 2 is a diagram illustrating a file structure for a subscriber certification device according to an exemplary embodiment.

FIG. 2 is a diagram illustrating a file structure for the subscriber certification device according an exemplary embodiment.

In the file structure according to an exemplary embodiment illustrated in FIG. 2, an MF (master file) 3000 is located on the top, three essential files (EF: elementary file) 3100, that is, $EF_{PL}$ (Preferred Languages) 3130, $EF_{ICCID}$ (Integrated Circuit Card (ICC) Identification) 3110, and $EF_{ARR}$ ( ) 3120, and a DF (Dedicated File) 3200 for phone book information are arranged under the MF 3000.

Further, the network access application (NAA) is configured as a separate ADF (Application DF) (for example, ADF1 3311 and ADF2 3321 illustrated in FIG. 2), and the application ID (AID) and application label values 3310 and 3320 are included in the $EF_{DIR}$ 3300 under the MF, and have forms that can be referred to.

The $EF_{PL}$, 3130 among the essential EFs 3100 located under the MF 3000 is a file including n preferred language codes (n being a positive number greater than 0), and the $EF_{ICCID}$ 3110 is a file including the only identification number for a UICC.

Further, $EF_{DIR}$ 3300 is a file having a list of first level applications such as USIMs installed in UICC.

According to an exemplary embodiment, EFs and DFs located under the MF 3000 can be referred to as a shared file system.

A file structure in which $EF_{PL}$ 3130, $EF_{ICCID}$ 3110, $EF_{arr}$ 3120, and $EF_{DIR}$ 3300 are arranged as essential files under the master file 3000 as illustrated in FIG. 2 may be used as a file structure for eUICC according to an exemplary embodiment.

In an exemplary embodiment, $EF_{PL}$ 3130 is a file including the preferred language code, and may include a language code list of a country which can provide service with eUICC. $EF_{PL}$ 3130 can be updated, with a language code currently set in the terminal having a highest priority, if necessary. An update access right of $EF_{PL}$ 3130 is a user certification number (User PIN), and when the user inputs his or her certification number, a language code priority may be changed.

$EF_{ICCID}$ 3100 is a file including a unique identification number of UICC, and its value is not changed after first recording. Therefore, the value cannot be modified even when the profile is added or deleted, and a separate management function is not necessary.

Since $EF_{DIR}$ 3300 includes an identifier of an application installed in UICC, the terminal may select a necessary application by referring to its value at the time of UICC initialization and perform network access certification. In $EF_{DIR}$ 3300, it is necessary for an AID (Application Identifier) value of the network access application of the profile to be able to be added/deleted according to additional/deletion of the profile. An update access right of EFDIR 3300 is a manger certification (ADM), and a security for management of its value is also necessary.

In connection therewith, in an exemplary embodiment, a method of managing shared files for UICC in a multi-profile environment is provided. More specifically, in an exemplary embodiment, a method of managing UCC shared files in an environment in which network access applications related to a profile are added, state-changed, or deleted, for example, according to addition, state change, or deletion of the profile, is provided.

Specifically, exemplary embodiments of the shared file management method as defined below for a eUICC in a multi-profile environment are provided.

With the method of managing shared files according to a first exemplary, there may initially be no network access application on the eUICC. When several profiles are installed, several network access applications may be added. Accordingly, when the network access application is added or deleted in this way, effectiveness of the application ID (AID) of the added or deleted NAA should be checked and a corresponding value should be added or delete to or from $EF_{DIR}$.

A second exemplary embodiment of the method of managing shared files includes a method of managing a state of a network access application according to its change of state. When the state of the network access application is changed to Activated/Deactivated, a state management method related to a change in a state of an application according to an exemplary embodiment is needed.

A third exemplary embodiment of the method of managing shared files provides security for giving manager rights among shared file access rights and value (ADM: ADMinistration access conditions) management. This is because, when profile-related data, such as an NAA list of $EF_{DIR}$, is unintentionally modified/deleted due to no ADM value security and right management, access certification through NAA corresponding to the modified/deleted profile-related data may be impossible.

A general directory file for a UICC will be first described so as to assist in understanding of exemplary embodiments prior to describing methods of managing shared files according to various exemplary embodiments, as described above.

Figure 3:
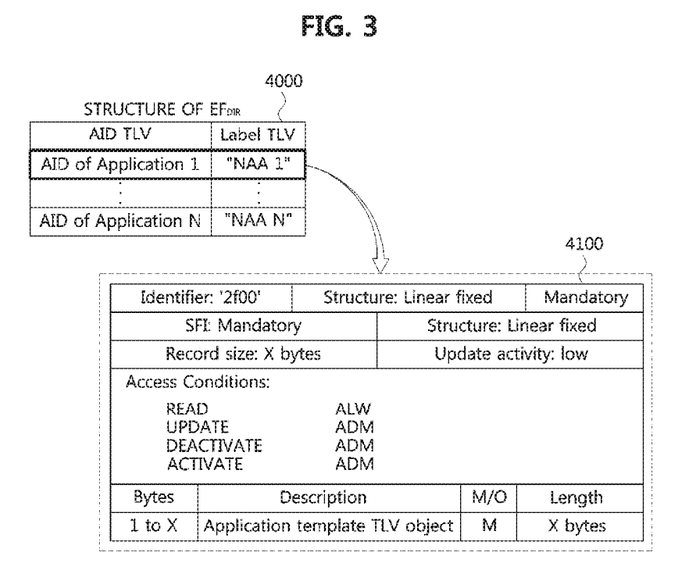
FIG. 3 is a diagram illustrating a data structure of an application directory file for a UICC according to an exemplary embodiment.

FIG. 3 is a diagram illustrating the data structure of the application directory file for the UICC according to an exemplary embodiment.

Referring to FIG. 3, the application directory file $EF_{DIR}$ 4000 for the UICC includes items of AID TLV 4001 and label TLV 4002, and is a linear fixed record type of file including several records 4100 as illustrated in a lower part of FIG. 3.

In the data structure of the directory file illustrated in FIG. 3, according to an exemplary embodiment, an application template data object including an application identifier (AID) and an application label, forms one record 4100. In FIG. 3, according to an exemplary embodiment, AID is set to "2F00" and the $EF_{DIR}$ data update right for the AID is set as administrator certification (ADM). Additionally, in an exemplary embodiment, read access is set to allowed.

Figure 4:
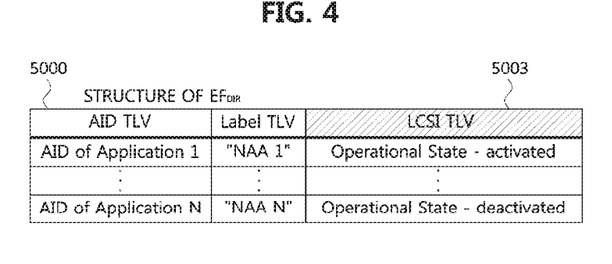
FIG. 4 is a diagram illustrating a data structure of an application directory file according to an exemplary embodiment.

FIG. 4 is a diagram illustrating the data structure of the application directory file according to an exemplary embodiment.

The application directory file 5000 according to an exemplary embodiment illustrated in FIG. 4 includes items of AID TLV, label TLV, and life cycle state integer (LCSI) TLV 5003.

In an exemplary embodiment, a state code item 5003 is added for state management of the NAA in a multi-profile environment, unlike the application directory file structure according to an exemplary embodiment illustrated in FIG. 3.

The life cycle state integer (LCSI) item 5003 of the network access application indicates a current state of the application.

The life cycle state integer of the application can be seen through FCI at an application selection time, but it may be necessary for the state value of the application to be seen at a time point before selection of each application, such as a case in which a terminal requests a user to select one of several applications.

Therefore, when the application state value is added as one item of the $EF_{DIR}$ record according to an exemplary embodiment, an external interworking device (for example, a terminal) can easily recognize a list of access applications in an active state by only referring to the file.

Hereinafter, changes to the file structure when the access application is added according to the addition of the profile will be described with reference to FIGS. 5 to 7 according to an exemplary embodiment.

Figure 5:
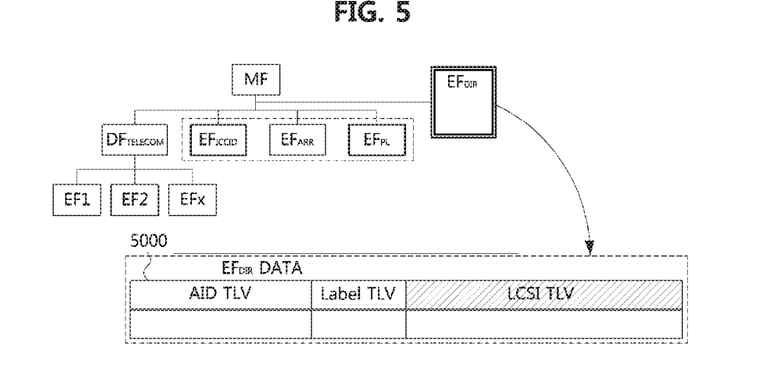
FIG. 5 is a diagram illustrating a file structure and data of the application directory file when there is no profile according to an exemplary embodiment.

FIG. 5 is a diagram illustrating a file structure and data of the application directory file when there is no a profile according to an exemplary embodiment.

FIG. 5 illustrates the file structure and the data of the directory file when there is no profile installed in an initial eUICC and there is no selectable NAA. In an exemplary embodiment of the file structure illustrated in FIG. 5, there are shared files in the eUICC, but the $EF_{DIR}$ data 5000 is empty.

Figure 6:
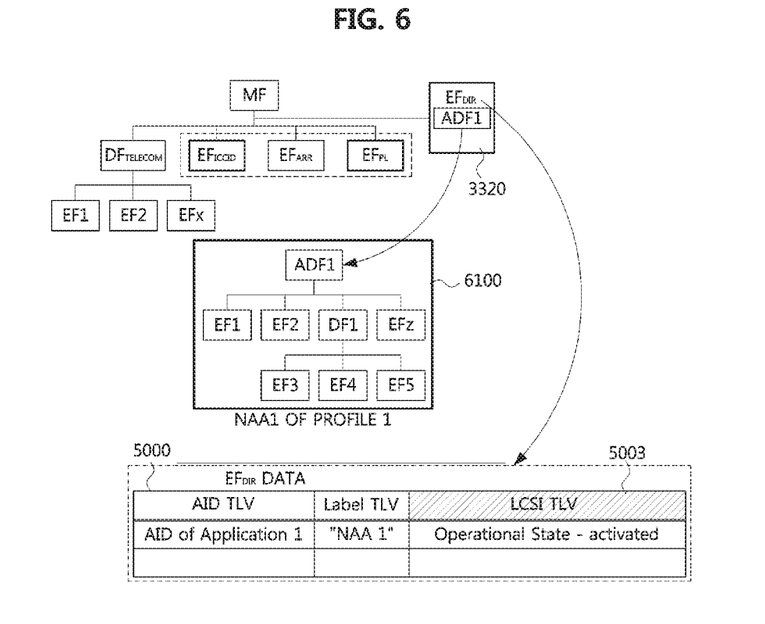
FIG. 6 is a diagram illustrating a file structure and data of the application directory file when a profile is installed according to an exemplary embodiment.

FIG. 6 is a diagram illustrating a file structure and data of an application directory file when a profile is installed according to an exemplary embodiment.

FIG. 6 illustrates, for example, a state of the application directory file when profile 1 is installed and NAA1 6100 is added while there is no installed profile in the file such as an exemplary embodiment described above with respect to FIG. 5.

Referring to FIG. 6, ADF1 for NAA1 is added to the eUICC file structure. Accordingly, data of an AID value, a label, and a state value 5003 for ADF1 is added to $EF_{DIR}$ 5000. In an exemplary embodiment illustrated in FIG. 6, the operation state value 5003 of NAA1 is set to "Activated."

Figure 7:
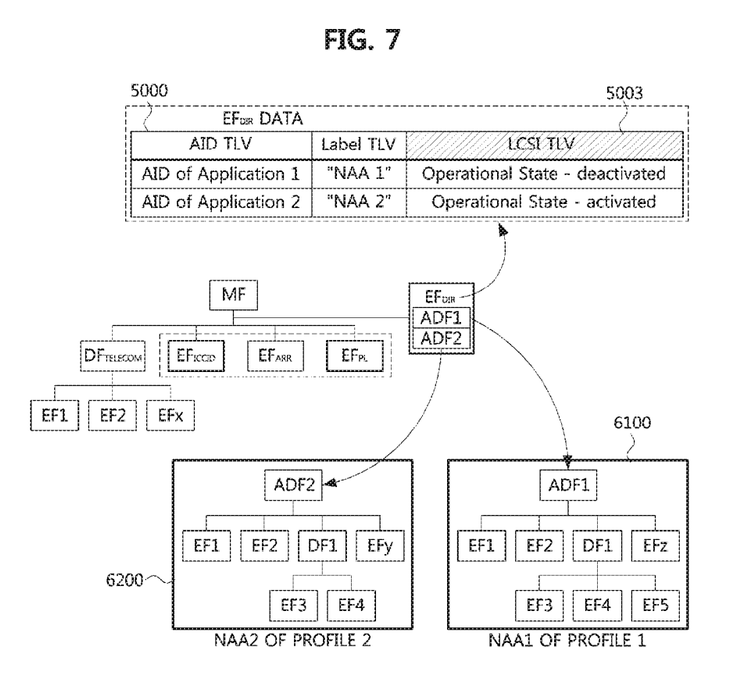
FIG. 7 is a diagram illustrating a file structure and data of the application directory file when a profile is additionally installed according to an exemplary embodiment.

FIG. 7 is a diagram illustrating a file structure and data of an application directory file when a profile is added according to an exemplary embodiment.

FIG. 7 illustrates a state in which profile 2 is additionally installed and NAA2 (6200) of profile 2 is added according to an exemplary embodiment when one profile already exists in the file structure such as an exemplary embodiment described above with reference to FIG. 6. It can be confirmed from FIG. 7 that ADF2 for NAA2 is added in the eUICC file structure.

According to an exemplary embodiment, when it is assumed that existing profile 1 is disabled and NAA1 is changed to a deactivated state, an NAA2 record is added to the $EF_{DIR}$ file 5000, and the state of NAA1 is changed to a deactivated state as illustrated in FIG. 7.

Hereinafter, exemplary embodiments of management methods regarding how to manage the shared file will be described.

To Update Data of an Application Directory File

The $EF_{DIR}$ update access right according to an exemplary embodiment is administrator certification (ADM).

The ADM value for manager right acquisition is generally a hex digit with a length of 8 bytes, similarly to a user certification number (User PIN; User Personal Identification Number), and right acquisition using the ADM value is possible after certification of a correct value through a VERIFY PIN command.

An $EF_{DIR}$ data updating scheme according to the addition of the network access application can be classified into two methods, according to exemplary embodiments, including a method of managing the ADM value in an external interworking device, and a method of managing the ADM value in an eUICC internal module, depending on whether an ADM management entity is an eUICC external device (or module) or an internal module (or device).

When the ADM value is managed by the eUICC internal module, two following management methods are included based on an eUICC internal structure.

A. When Each Profile has an ADM Value

The profile directly registers, deletes, or state-changes an AID, a label, and a state value of a profile-related NAA in the $EF_{DIR}$.

B. When the Shared File Manager has the ADM Value

After the profile is installed, the shared file manager on the eUICC is requested to register, delete, or change the data.

A method of updating the directory data according to an exemplary embodiment may further include an updating method through OTA in an external interworking device, for example, a profile owner or an external shared file manager without using an ADM value certification scheme.

Hereinafter, the directory data updating methods according to exemplary embodiments will be described with reference to FIGS. 8 to 11.

Figure 8:
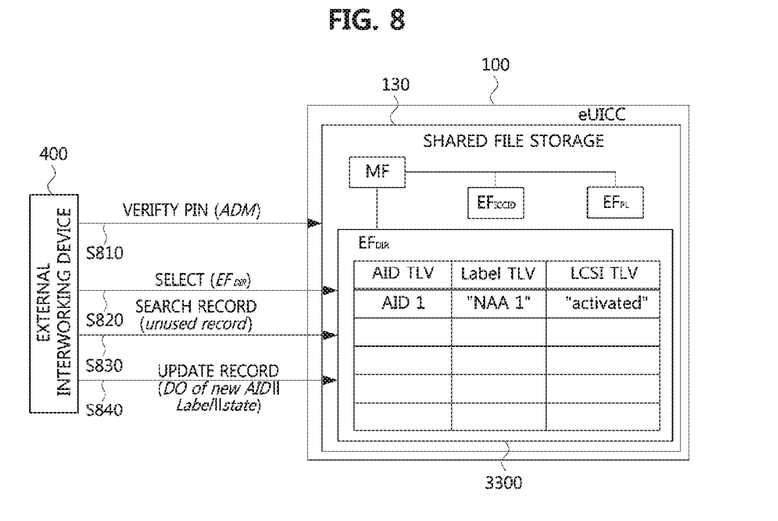
FIG. 8 is a flow diagram illustrating a directory data updating method according to an exemplary embodiment.

FIG. 8 is a diagram illustrating a directory data updating method according to an exemplary embodiment.

In an exemplary embodiment illustrated in FIG. 8, when the ADM value is managed by the external interworking device 400, the external interworking device 400 registers NAA in the $EF_{DIR}$ 3300 after the profile is installed.

An exemplary embodiment of the external interworking device 400 includes a subscription manager module (SM; Subscription Manager) or a profile owner server (MNO server).

A procedure in which the external interworking device 400 registers a NAA list of the profile in the $EF_{DIR}$ 3300 includes acquiring an $EF_{DIR}$ update right through ADM certification (in operation S810), selecting an $EF_{DIR}$ (in operation S820), searching for an unused record number after the $EF_{DIR}$ selection (in operation S830), and performing updating of the NAA AID, the label, and the state value for the unused record number (in operation S840).

In this case, error processing and subsequent processing, such as re-attempt of registration due to the error, that may occur may be performed by the external interworking device 400.

Meanwhile, a procedure of changing or deleting the state value of the NAA record of the profile of $EF_{DIR}$ through a procedure similar to the registration when changing and deleting of the state of the profile is attempted may be necessary. In this case, the error processing and the subsequent processing that can occur may be performed by the external interworking device 400.

When the ADM value is managed by the external interworking device 400, the external interworking device 400 should be a device or a module that is reliable by the profile owner (for example, MNO), and management such as generation, distribution, or updating of an initial ADM value may be performed in an manner that is reliable by the profile owner.

Figure 9:
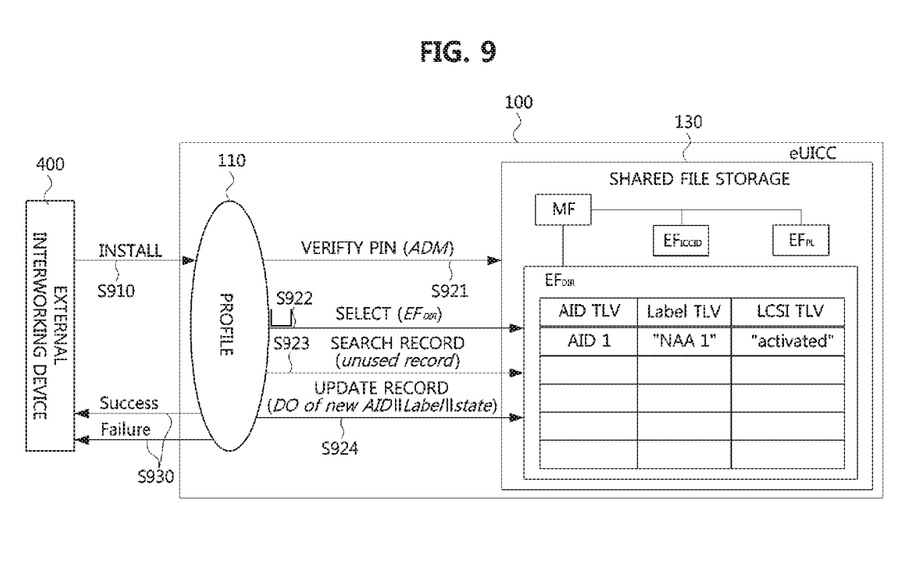
FIG. 9 is a flow diagram illustrating a directory data updating method according to yet another exemplary embodiment.

FIG. 9 is a diagram illustrating a directory data updating method according to yet another exemplary embodiment.

In an exemplary embodiment illustrated in FIG. 9, a method of registering NAA in $EF_{DIR}$ is provided when each profile 110 located in the eUICC internal module has the ADM value and directly manages the NAA list related to the profile among directory data updating methods according to an exemplary embodiment.

A procedure of registering NAA in $EF_{DIR}$ may be performed at a time of profile data installation (in operation S910). A procedure of registering NAA in $EF_{DIR}$ may include acquiring an $EF_{DIR}$ update right through ADM certification (in operation S921), selecting an $EF_{DIR}$ (in operation S922), searching for a unused record number after the $EF_{DIR}$ selection (in operation S923), and performing updating of the NAA AID, the label, and the state value for the unused record number (in operation S924), similar to an exemplary embodiment described above with reference to FIG. 8.

According to an exemplary embodiment, an error that may occur in the registration process can be processed in the profile 110, and the profile 110 can return an appropriate processing result such as success or failure to the external interworking device 400 (in operation S930).

In this case, a UICC application programming interface (API) defined in ETSI TS102241 can be used as the interface between the profile and the shared file system inside the eUICC, according to an exemplary embodiment.

Meanwhile, a procedure of changing or deleting a state value of the NAA record of the profile 110 in $EF_{DIR}$ using a procedure similar to the registration, even at the time of the state changing and the deletion of the profile may be necessary. In this case, in an exemplary embodiment, an error that can occur is processed in the profile 110, and an appropriate processing result is returned to the external interworking device 400.

When the profile 110 has the ADM value, it is necessary for an eUICC issuing entity to distribute the ADM value of eUICC to the owner of each profile. In this case, according to an exemplary embodiment, a reliable method may be needed between the owner of the profile and the eUICC issuing entity. Further, a network service provider that can install a profile in the eUICC may need a method of securing security and reliability of the data of the shared file of eUICC.

Figure 10:
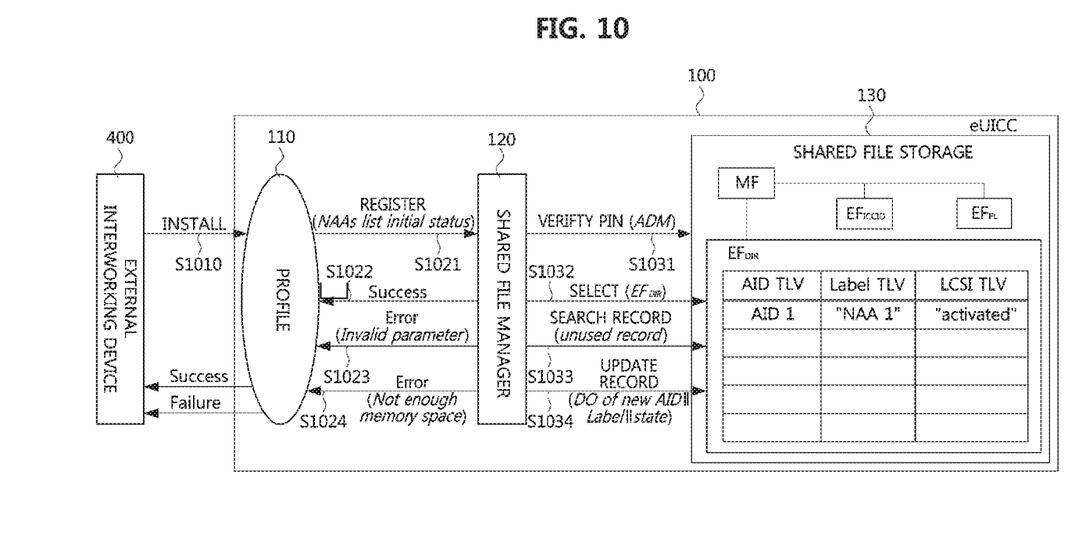
FIG. 10 is a flow diagram illustrating a directory data updating method according to yet another exemplary embodiment.

FIG. 10 is a diagram illustrating a directory data updating method according to yet another exemplary embodiment.

FIG. 10 illustrates an exemplary embodiment in which NAA is registered in the $EF_{DIR}$ when the shared file manager 120 separately present in the eUICC internal module has the ADM value, and manages the NAA list related to the profile in the directory data updating methods according to an exemplary embodiment such as exemplary embodiments described above.

In an exemplary embodiment illustrated in FIG. 10, the procedure of registering NAA in the $EF_{DIR}$ is started by the installed profile 110 requesting the shared file manager 120 to register NAA when the profile data is installed in the eUICC in response to the profile installation request (in operation S1010) of the external interworking device 400 (in operation S1021).

The procedure of registering NAA in the $EF_{DIR}$ includes acquiring an $EF_{DIR}$ update right through ADM certification (in operation S1031), selecting $EF_{DIR}$ (in operation S1032), searching for a unused record number after selecting $EF_{DIR}$ (in operation S1033), and performing updating of a NAA AID, a label, a state value with respect to the unused record number (in operation S1034), similarly to some other exemplary embodiments described above.

In this case, the shared file manager 120 may determine error situation such as effectiveness of NAA AID to be registered, overlap with a previously registered AID, or presence of an available record, and return appropriate error content to the profile (operations S1022, S1023 or S1024).

An UICC application programming interface defined in ETSI TS102241 may be used as the interface between the shared file manager 120 and the shared file storage 130 in the eUICC, similarly to an exemplary embodiment described above with reference to FIG. 9, and an exemplary interface between the profile 110 and the shared file manager 120 may be defined as will be described below according to an exemplary embodiment.

When the shared file manager 120 is separately present in the eUICC as in an exemplary embodiment illustrated in FIG. 10, the module may provide functions such as NAA registration, state change, and NAA deletion to an internal interface. In this case, an application programming interface (API) for calling each function may be configured to include, for example, commands below:

register (NAAs list and initial state): This may be used to register NAA (of the profile) in the $EF_{DIR}$, and the parameters may include a NAA list and an initial state.

update (NAA ID and state): This may be used to change a state of NAA registered in the $EF_{DIR}$, and parameters include a NAA ID and a state to be changed.

delete (NAA ID or NAAs list): This may be used to delete NAA registered in the $EF_{DIR}$, and parameters include a NAA ID or NAA list to be deleted.

Meanwhile, even at the time of state-changing or deleting of the profile, the profile 110 according to an exemplary embodiment may request the shared file manager 120 to change or delete a state value of its own NAA record in the $EF_{DIR}$ through the internal interworking interface, similarly to the registration procedure.

In this case, the shared file manager 120 may determine an error that may occur and inform the profile 110 of an appropriate error situation.

When the shared file manager 120 on the eUICC has the ADM value according to an exemplary embodiment, it is not necessary for the owner of the profile to know the ADM value. Further, since the shared file manager 120 manages the ADM value, the eUICC shared file data is less likely to be changed or deleted by other modules, and reliability and the safety of the shared file data can be improved.

Figure 11:
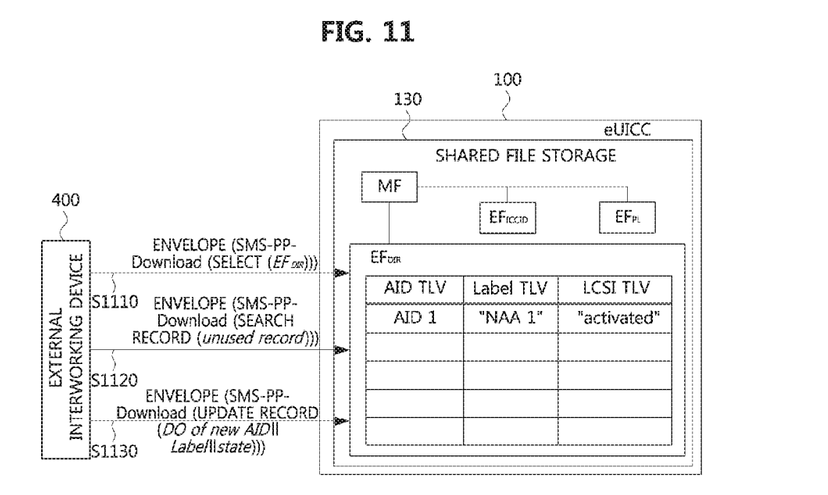
FIG. 11 is a flow diagram illustrating a directory data updating method according to yet another exemplary embodiment.

FIG. 11 is a diagram illustrating a directory data updating method according to yet another exemplary embodiment.

FIG. 11 illustrates an exemplary embodiment of a method of registering NAA in the $EF_{DIR}$ when the shared file is managed through OTA among the directory data updating methods according to an exemplary embodiment such as the ones described above.

In the method of managing the eUICC shared file through OTA illustrated in FIG. 11, according to an exemplary embodiment, a short message service (SMS) message used for a mobile communication system can be utilized.

In an exemplary embodiment illustrated in FIG. 11, a procedure similar to other exemplary embodiments described above is performed when only a command part actually input to the eUICC card is considered except for an SMS message part on a network.

That is, a procedure of updating values in the shared file includes a selecting an $EF_{DIR}$ (in operation S1110), searching for a unused record number after the $EF_{DIR}$ selection (in operation S1120), and performing updating of the NAA AID, the label, and the state value for the unused record number (in operation S1130), similarly to other exemplary embodiments described above except for the ADM value certification procedure.

With the method of managing the shared file through OTA as in an exemplary embodiment, it is possible to guarantee confidentiality and integrity of the message through a previously shared OTA key. In this case, according to an exemplary embodiment, error processing that may be needed, may be performed by a module that processes an OTA message.

Meanwhile, even in an exemplary embodiment described above, at the time of changing or deleting the state of the profile, the external interworking device 400 may change or delete the state value of the NAA record of the profile of the $EF_{DIR}$ through the OTA message, similarly to the registration, such as the registration described above in other exemplary embodiments. In this case, error processing that may be needed and subsequent operations may be performed by the external interworking device 400, that is, a module that actually generates and processes the OTA message.

When the external interworking device 400 manages an OTA key value, the external interworking device 400 should be a module that is reliable for the profile owner (for example, MNO), management such as generation, distribution, and updating of an initial OTA key value is performed in a manner that is reliable for the profile owner.

Figure 12:
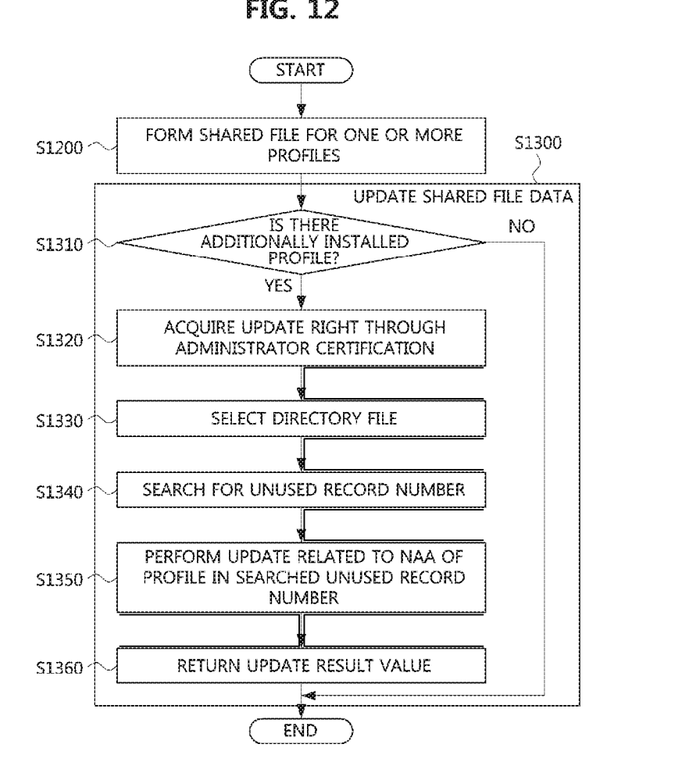
FIG. 12 is a flowchart of a method of managing shared files according to an exemplary embodiment.

FIG. 12 is a flowchart illustrating a method of managing shared files according to an exemplary embodiment.

The method of managing shared files according to an exemplary embodiment may include forming a shared file for one or more profiles (in operation S1200), and updating shared file data (in operation S1300).

The shared file for one or more profiles according to an exemplary embodiment may have the file structure such as the one described above with reference to FIGS. 4 to 7. That is, the shared file structure for the eUICC according to an exemplary embodiment includes a master file, and one or more files associated with the master file.

In an exemplary embodiment, one or more files associated with the master file include an application directory file. The application directory file may include a network access application list and state information of each network access application.

In this case, a state of the network access application may be in an activated or deactivated state.

Meanwhile, updating the shared file data (in operation S1300) may include sub-operations, such as the ones illustrated in FIG. 12. That is, the system checks if there is an additionally installed profile (in operation S1310). When there is the installed profile, an update right is acquired through an administrator certification (in operation S1320). When the update right is acquired or obtained, the application directory file is selected (in operation S1330), an unused record number is searched for (in operation S1340), and then, updating related to the network access application of the profile is performed in the detected unused record number (in operation S1350).

The entity that updates the shared file data (in operation S1300) according to an exemplary embodiment may be the shared file storage 130. According to an exemplary embodiment, when the profile 110 or the shared file manager 120 is located between the shared file storage 130 and the external interworking device 400, the shared file manager 120 or the profile 110 returns a result of performing the updating to the profile 110 or the external interworking device 400 (in operation S1360).

It is to be understood that some of sub-operation of updating the shared file data (operation S1300) may be omitted or changed according to each exemplary embodiment of the exemplary data updating methods described above.

The shared file management method according to exemplary embodiments including operations, operation orders, and commands described above can be implemented as a computer-readable program code in a computer-readable recording medium.

The computer-readable recording medium includes all types of recording devices in which data that can be read by a computer system is stored. For example, the computer-readable recording medium includes, for example, a ROM, a RAM, a CD-ROM, a DVD-ROM, a Blu-ray, a magnetic tape, a floppy disk, an optical data storage device, or the like, and further includes a medium implemented in the form of carrier waves (for example, transmission over the Internet).

Further, the computer-readable recording medium is distributed to computing systems connected over a network, and a computer-readable code can be stored and executed in a distributed manner. Also, a functional program code for performing exemplary embodiments can be easily inferred by programmers in the technical field to which exemplary embodiments belongs.

The methods of managing shared files of eUICC in a multi-profile environment and the apparatus using the same have been described above using various exemplary embodiments.

Among the shared files of eUICC, the essential files include the preferred language file $EF_{PL}$, the only identifier file $EF_{ICCID}$, and the network access application list file $EF_{DIR}$, and the preferred language file and the identifier file are files that cannot be modified or can be modified.

On the other hand, it is necessary for the network access application list file $EF_{DIR}$ to be updated as the profile is installed, state-changed, or deleted. Accordingly, in an exemplary embodiment, the shared file management method is provided. Specifically, various methods for addition, state change, and deletion of the network access application in the network access application list file in a multi-profile environment have been described according to various exemplary embodiments, and a security issue and a related processing procedure for each method have been defined.

According to an exemplary embodiment, it is possible to embody roles and development ranges of eco-system providers of the eUICC, such as eUICC card manufacturers, network service providers, and profile management servers.

The above description of exemplary embodiments is provided for the purpose of illustration, and it will be understood by those skilled in the art that various changes and modifications may be made without changing a technical conception and/or any essential features of exemplary embodiments. Thus, above-described exemplary embodiments are exemplary in all aspects, and do not limit the present disclosure.

While exemplary embodiments have been described above in detail, it should be understood that various modification and changes may be made without departing from the spirit and scope of the inventive concept as defined in the appended claims and their equivalents.

The invention claimed is:

1. An embedded universal integrated circuit card (eUICC) built into and installed in a mobile terminal, the eUICC comprising:

a shared file memory that stores at least one shared file for a plurality of profiles, the at least one shared file including a list related to the profiles, the list related to the profiles including at least one identifier corresponding to a network access application in each of the profiles; and a processor configured to:
manage the at least one shared file for the plurality of profiles, wherein the at least one shared file includes an application directory file including a state value indicating a current state of a network access application corresponding to at least one installed profile among the profiles, and at least one of an application dedicated file or parameter data, provide a list indicating the state value of the network access application with reference to the application directory file, receive a request from an external manager, and update the state value and either a network access application identifier (AID) or a label related to the request, based on an update right of the application directory file being acquired through a certification, wherein the network access AID, the label and the state value are included in the application directory file.

2. The eUICC of claim 1, wherein the plurality of profiles include at least one of a provisioning profile or an operational profile.

3. The eUICC of claim 2, wherein the provisioning profile is a profile that enables access to a communication network when the provisioning profile is installed on the eUICC.

4. The eUICC of claim 1, wherein the shared file memory is further configured to store a master file and at least one file associated with the master file.

5. The eUICC of claim 4, wherein the shared file memory is further configured to store at least one elementary file.

6. The eUICC of claim 1, wherein the at least one shared file includes an AID tag length value (TLV).

7. A method of managing files of an embedded universal integrated circuit card (eUICC), the method comprising:
storing at least one shared file for a plurality of profiles in a shared file memory, the at least one shared file including a list related to the profiles, the list related to the profiles including at least one identifier corresponding to a network access application in each of the profiles;

managing the at least one shared file for the plurality of profiles, wherein the at least one shared file includes an application directory file including a state value indicating a current state of a network access application corresponding to at least one installed profile among the profiles, and at least one of an application dedicated file or parameter data related to a network access application;

providing a list indicating the state value of the network access application with reference to the application directory file;

receiving a request from an external manager;

updating the state value and either a network access application identifier (AID) or a label related to the request, based on an update right of the application directory file being acquired through a certification, wherein the network access AID, the label and the state value are included in the application directory file.

8. The method of claim 7, wherein the plurality of profiles include at least one of a provisioning profile or an operational profile.

9. The method of claim 8, wherein the provisioning profile is a profile that enables access to a communication network when the provisioning profile is installed on the eUICC.

10. The method of claim 7, wherein the shared file memory is further configured to store a master file and at least one file associated with the master file.

11. The method of claim 10, wherein the shared file memory is further configured to store at least one elementary file.

12. The method of claim 7, wherein the shared file memory stores an AID application ID (AID) tag length value (TLV).

13. The method of claim 7, wherein each of the profiles of the list comprises an access condition selected from among read access, update access, deactivate access, and activate access, and a corresponding access right selected from among administration access conditions.

14. The method of claim 7, wherein the managing the at least one shared file comprises:
selecting the list from among the at least one shared file;
identifying an unused profile record in the selected list; and
updating the network access AID, a tag length value (TLV), and a state value, which is a life cycle state integer, of the identified unused profile record.

* * * * *

UNITED STATES PATENT AND TRADEMARK OFFICE
CERTIFICATE OF CORRECTION

PATENT NO.         : 10,862,881 B2
APPLICATION NO.    : 15/696284
DATED              : December 8, 2020
INVENTOR(S)        : Myoung Hee Seo et al.

Page 1 of 1

It is certified that error appears in the above-identified patent and that said Letters Patent is hereby corrected as shown below:

On the Title Page

Assignee (71):
Delete "KT Corporation, Seongnam-si (KR)"
Insert --SAMSUNG ELECTRONICS CO., LTD., Suwon-si (KR)--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*